United States Patent [19]

Izard

[11] Patent Number: 5,013,405
[45] Date of Patent: May 7, 1991

[54] METHOD OF MAKING A LOW DENSITY FROTHED MINERAL WOOL

[75] Inventor: David G. Izard, Wauconda, Ill.

[73] Assignee: USG Interiors, Inc., Chicago, Ill.

[21] Appl. No.: 389,514

[22] Filed: Aug. 4, 1989

Related U.S. Application Data

[63] Continuation-in-part of Ser. No. 2,495, Jan. 12, 1987, abandoned.

[51] Int. Cl.$^5$ .............................. D21J 1/00; D21J 1/20
[52] U.S. Cl. ...................................... 162/101; 162/145; 162/152; 162/202; 162/208; 162/217
[58] Field of Search ................... 264/518, 86, 87, 101, 264/102, 45.3, 50; 162/101, 145, 147, 181.6, 181.8, 103, 104, 209, 123, 125, 129, 208, 207, 152, 156, 202, 204, 205, 206, 217; 428/241, 240, 262, 311.1

[56] References Cited

U.S. PATENT DOCUMENTS

| | | | |
|---|---|---|---|
| 3,006,805 | 10/1961 | Waggoner | 162/181.6 |
| 3,228,825 | 1/1966 | Waggoner | 162/101 |
| 3,275,496 | 9/1966 | Sponsel | 264/45.3 |
| 3,494,824 | 2/1970 | Roberts | 162/152 |
| 3,871,952 | 3/1975 | Robertson | 162/101 |
| 3,974,024 | 8/1976 | Yano et al. | 162/209 |
| 4,062,721 | 12/1977 | Guyer et al. | 162/101 |
| 4,235,667 | 11/1980 | Bergstrom et al. | 162/209 |
| 4,551,384 | 11/1985 | Aston et al. | 162/101 |
| 4,613,627 | 9/1986 | Sherman et al. | 264/50 |
| 4,734,321 | 3/1988 | Radvan et al. | 428/283 |
| 4,911,788 | 3/1990 | Pittman et al. | 162/145 |

FOREIGN PATENT DOCUMENTS

| | | |
|---|---|---|
| 0148760 | 7/1985 | European Pat. Off. |
| 0054807 | 3/1985 | Japan ........ 264/102 |
| 1263812 | 2/1972 | United Kingdom |

Primary Examiner—Mary Lynn Theisen
Attorney, Agent, or Firm—Robert H. Robinson; John M. Lorenzen

[57] ABSTRACT

A method for the manufacture of very low density mineral wool structural panels on a moving foraminous support wire by frothing a dilute aqueous dispersion of mineral wool is disclosed. The forth, a mass of delicate, non-resilient and non-uniform bubbles among the entangled mineral wool fibers readily breaks, is stripped of water and dried without substantial loss of the highly open, porous structural configuration by a first controlled rate of maturation dewatering followed by brief pulses of high vacuum. Then the open structure is rapidly stripped of remaining water and dried by passing high volumes of heated dry air through the structure with continued vacuum. The drainage water may be recycled in the process to maintain a low level of binder and any frothing aid additions.

19 Claims, 2 Drawing Sheets

METHOD OF MAKING A LOW DENSITY FROTHED MINERAL WOOL

This is a continuation-in-part of copending application Ser. No. 002,495, filed on Jan. 12, 1987, now abandoned.

BACKGROUND OF THE INVENTION

1. Field of the Invention

This invention relates to fibrous mineral wool products. More particularly, it relates to a method for manufacturing strong, structural panels of mineral fiber having a density of from about 3 to about 10 pounds per cubic foot which may be used as acoustical ceiling tiles, thermal insulating panels, sound absorbing panels, pipe and beam insulation and similar products.

2. Description of the Prior Art

The water felting of dilute aqueous dispersions of mineral wool and lightweight aggregate is known. By such methods, a dilute dispersion of mineral wool, lightweight aggregate, binder and other adjuvants are flowed onto a moving foraminous support wire screen such as that of an Oliver or Fourdrinier mat forming machine for dewatering at line speeds of about 10-50 feet per minute. The dispersion dewaters to form a mat first by gravity means and then by vacuum suction means. The wet mat is dried over a number of hours in convection drying ovens; and the product is cut and optionally top coated to produce lightweight structural panels such as acoustical ceiling tiles. Such methods cannot produce low density structural panels below about 12 pounds per cubic foot density. A "structural" panel, by definition, is capable of supporting its own weight without visible sagging, bending or collapsing when supported only at the edges of the panel, as in a suspended ceiling grid.

It is also known to form stable foams with mineral wool. U.S. Pat. No. 4,447,560 suggests a low density insulation sheet may be made by forming a first slurry of fiber containing synthetic rubber latex solids. A detergent slurry is then formed and the two slurries admixed to about 15% solids consistency, agitated to a stable foam, and oven dried. The extremely time consuming, and energy intensive, drying of the stable foam from 15% solids is a severe economic detriment.

U.S. Pat. No. 4,613,627 discloses a modified wet pulp process for forming an acoustical ceiling tile wherein the binder is foamed separately from the rest of the solid ingredients. The foamed binder is then combined with an admixture of the other solids, and the admixture is cast, screeded, textured, press molded and dried.

The use of foam to prevent stratification of the various particles in a slurry of mineral wool, aggregate and other solids during the water felting of mineral fiber panels is taught by Guyer et al in U.S. Pat. No. 4,062,721. The foam retains the particles in a space matrix but also increases the water drainage time according to Guyer et al who solve that problem by delaying the foaming of the furnish until after gravity drainage has occurred. Guyer et al teach that more water is removed because the foam reduces the gross porosity of the furnish thus making vacuum dewatering more effective. This means that air is not passing through the furnish but pressing down on it and reducing the porosity still further.

Bryant teaches in U.S. Pat. No. 1,841,785 that a tough coherent skin of paper-like consistency may be created on the lower surface of a foamed mass of cellulose fibers and water on a Fourdrinier wire by subjecting the lower surface momentarily to a vacuum without imparting the suction deeply into the mass so that only the lower surface area is compacted. Further dewatering of the foamed mass occurs under a lesser vacuum so that the fibrous body of the mass is not broken down or compacted. The still wet fibrous body is then dried by passing it through an oven into which hot air is blown at levels above and below the fibrous body. The spongy consistency of the body, except for the tough skin, is thus preserved.

European Patent Application No. 148,760 teaches the manufacture of an air permeable sheet of mineral fibers and plastic powders. A dispersion of glass fibers, plastic powder, and a foaming agent is aerated to produce a fine-bubbled foam which is then drained on Fourdrinier wire to form a web of unbonded fibers interspersed with the plastic. The web is transferred carefully from the wire to a mesh belt where a binder is applied to the web and it is dried gently in a drying tunnel whereupon bonding of the mineral fibers takes place. Some loss of the plastic powder occurs.

British Patent Specification No. 1,263,812 teaches a method for forming a fiber-containing polymeric sheet capable of being thermoformed or cold pressed. The method includes feeding a paste of a polymeric powder and binder into a foamed suspension of fibers, dewatering the foamy mixture and drying the resulting sheet on a rotary drum drier. The foam is maintained by the addition of surfactant as needed. The dried sheet has a soft, crumbly texture.

Furthermore it is known that paper webs constituted mainly by noble cellulose fibers and fibrilles may be formed from foams. The basic formation of the cellulose fiber for manufacture of paper gives rise to highly fractured fiber fragments and fibrils having jagged, fuzzy, microstructured surfaces suitable to trap and aid entanglement of microscopic-sized foam bubbles. This is not true for mineral fibers or mineral aggregate, which have smooth surfaces in comparison to the jagged and fuzzy microstructured surfaces of cellulose fibers.

In U.S. Pat. No. 3,228,825, it is suggested that lightweight foams of attenuated glass fibers might be formed into lightweight fibrous products of less than 5 pounds per cubic foot density. According to this patent, microscopic bubbles are generated in an aqueous suspension of lightweight aggregate and attenuated glass fibers in order to achieve uniform incorporation of both in the fibrous structure. Very highly refined cellulosic fibrilles serve as the binder for the glass fibers. The proposed products would appear to be extremely flexible, incapable of structural panel uses.

It is an object and advantage of the present invention to provide low density structural panels of mineral fiber by a wet felting process without having to dry extremely high amounts of water out of the wet mat over long periods of time.

A further object is to provide panels having excellent strength and integrity at densities less than about 10 pounds per cubic foot.

A still further object and advantage is the provision of a wet felting method for manufacturing low density mineral panels in a facile, rapid manner wherein the mat is dewatered and dried in a few minutes.

The above objects and advantages, and others which will become more apparent from the ensuing description, are based upon the peculiar rheology of a delicate, aqueous froth of unstable and weak bubbles, and further upon high volume, high velocity through-air drying of wet, open porous structures. Basically, in accordance with the present invention, the applicant has now discovered a process for rapidly forming shaped structural panels such as acoustical ceiling tile that combine very low densities with good strengths. A modified wet process is employed wherein a dilute aqueous slurry is foamed to a delicate froth between scrim cover sheets on a moving foraminous support wire screen. The froth dewaters and matures under quiescent conditions and is then rapidly ruptured by high vacuum to form a sufficiently stable porous structure that may be rapidly stripped of remaining water and dried by passing large volumes of heated air through the structure without any substantial collapse of the open porous structure.

DESCRIPTION OF THE PREFERRED EMBODIMENTS

Figure 1:
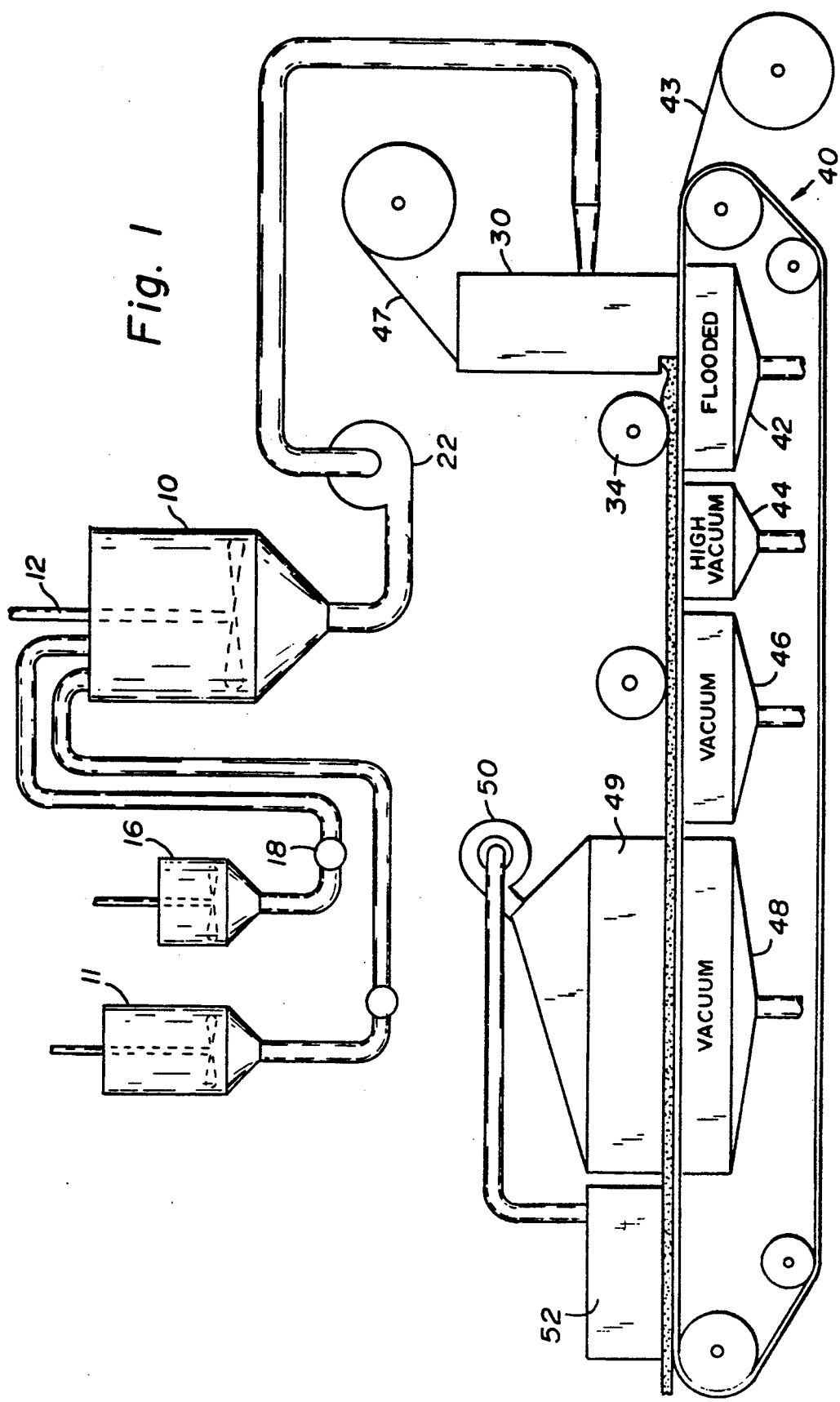
FIG. 1 is a schematic diagram of a frothed mineral panel manufacturing process line in accordance with the present invention.

Basically, referring to FIG. 1, a delicate, non-resilient, non-viscous and, therefore, unstable mass of irregularly sized bubbles is generated in a mineral fiber slurry in main mix tank 10. This is in contrast to forming a stable foam wherein bubble size is very small, even microscopic, and is generally very uniform, with each bubble behaving as a stable, rigid sphere when subjected to stresses. In a stable foam, the liquid film of the walls of the resilient, stable spheres exhibit great resistance to deformation and dewatering when acted upon by even large stress forces. The process of the present invention generates rather unstable, transitory bubbles with a foaming aid such as polyvinyl alcohol. The froth as formed has active binder and foaming aid constituents forming a large part of the dissolved solids in the liquid film of the bubbles. The liquid coating the entangled solids of fiber and aggregate has a solids consistency which increases from that of the initial dispersion as the froth dewaters, matures and dries out to exhaustion. The bubbles rapidly dewater as they age and mature under generally quiescent conditions in first flooded section 42 of the foraminous wire 40. The froth dewaters to a point where the solids in the wet mass have increased from about 3 weight % to about 6-10 weight % consistency. It is believed that at this point the fiber and aggregate have become sufficiently entangled and coated by binder as to retain the open, porous structural configuration upon the drying out and collapsing of the bubbles.

Thereafter, the bubbles are collapsed and the wet mass is further stripped of water remaining in the interstitial spaces of entangled fiber by providing a pressure differential equivalent to about 4-20 inches of mercury across the wet mass in section 44. It is preferred to employ brief bursts of high vacuum initially. This breaks the bubble walls and the draining liquid further coats the contact points on the highly voided entangled mass of fiber, aggregate and scrim. This provides further structural integrity to the wet panel. Thereafter, water stripping and drying are enabled via continued vacuum of from about 0.4 to about 4 inches of mercury in sections 46 and 48 while passing high volumes of high velocity heated air through the mass without substantial collapse of the open, highly voided structure. Thereby structural mineral panels having a density of about 3-10, and preferably about 3-6 pounds per cubic feet, with a modulus of rupture of about 60-120 pounds per square inch measured with nonwoven fiber glass scrim cover sheets in place are obtained.

The products made according to the process of the present invention are predominantly fibrous mineral products. The mineral fiber for use in the present invention may be any of the conventional fibers prepared by attenuating a molten stream of basalt, slag, granite or other vitreous mineral constituent. The molten mineral is either drawn linearly through orifices, commonly referred to as textile fibers, or it is recovered tangentially off the face of a spinning cup or rotor, commonly referred to as wool fibers. Ceramic fibers and organic fibers such as polyamide fibers, acrylic fibers, polyester fibers, polyolefin fibers, cellulose fibers and the like may also be used. Expressed in terms of the dry solids content of the final panel product, the fiber constituent is suitably present in an amount of about 10-95% by weight, and preferably about 30-40%.

Another essential ingredient is an inorganic lightweight aggregate of exfoliated or expanded volcanic glass origin. Such aggregate includes the well known expanded perlite, exfoliated vermiculite, exfoliated clays and like products which are available in a variety of mesh sizes. Generally, mesh sizes less than 8 mesh are suitable, although not critical. Generally expanded perlite is preferred for reasons of availability and economy. The amount of lightweight aggregate included may vary from about 20% to about 70% on a dry weight basis in the final product. It is particularly preferred to use expanded perlite having particle sizes from about 12 to about 100 mesh in amounts of about 30-40% for very lightweight structural panels of the invention. The lightweight aggregate is quite friable and some of it will be shattered by the mixing herein contemplated. The panel being formed is provided with a bottom cover sheet, and some of the shards of aggregate and any separated fiber shot will collect on the bottom cover sheet.

It is also preferred that the composition include about 3-25% by weight coarse cellulose fibers to aid flotation and entanglement. Such fibers generally are about 1/16-¼ inch in length with some fibers being up to about one inch. These are conveniently provided by slushing newspaper or other papers in a "Slush Maker". That is, suitable coarse cellulose fibers may be made by charging about 10-20 pounds of newspapers or other paper stock for every 100 gallons of water in a high intensity, high shear mixer and agitating the mix for a couple of minutes in the mix tank 11. Increasingly stiff panels are made as the proportion of cellulose is increased but for ease of cutting with a knife and to avoid jagged edges the amount is preferably about 3 to 5 weight per cent. This amount also aids in retaining binder in the solids collected on the wire screen. At the 5% level, about half of the latex resin binder is retained. As the amount decreases, the amount of binder retained in panel formation decreases and strength of the panel decreases.

Ordinarily the foregoing fiber ingredients and lightweight aggregate together constitute about two-thirds of the total solids of the final panel product. Preferably, the mineral fiber and the aggregate are included in roughly equal amounts.

Any binder that will generate, by itself or in combination with a foaming aid, rather unstable, transitory, delicate and non-resilient bubbles upon high energy mixing may be used. Cooked starch binders or resin latex binders that are homopolymers or copolymers containing acrylic, acetate, or styrene-butadiene groups, for example, that provide the requisite bubbles may be used. A preferred combination of binder and foaming aid is polyvinyl acetate with polyvinyl alcohol. It is particularly preferred to employ a polyvinyl acetate that is partially hydrolyzed for foaming the mineral wool and lightweight aggregate slurry to a delicate non-resilient froth. Thus polyvinyl acetates which are from about 87% to about 91% hydrolyzed (that is, in which there is about 9% to about 13% residual polyvinyl acetate) and have molecular weights from about 22,000 to about 110,000 appear to be the most effective with a separate polyvinyl acetate binder. Polyvinyl acetates that are hydrolyzed from about 75% up to about 87% and from 91 to about 95% may be used but are not as effective as those within the preferred range.

The amount of binder or binder plus foaming aid is quite variable. Generally about half to three-quarters of the amounts initially added will pass through the wire in the drainage white water. Recycling draining water to the main mixer for dilution slurry formation will keep binder and foaming aid usage at a minimum since only make-up additions for the amounts retained in the panel will be required. The polyvinyl acetate is present in the panel in an amount of about 5–30%, preferably about 10–15%, by weight. Preferred polyvinyl acetates are commercially available as the VINAC or AIRFLEX resins from Air Products Company, X-LINK or RESYN resins from National Starch and Chemicals Corporation, or CASCOREZ resins from Borden Chemical Division of Borden, Inc.

Generally the polyvinyl alcohol will be solubilized to appropriate concentration levels of about 0.1% to about 5% of total solids in a separate vessel for use in the present process such as in the mix tank 16, and amounts will be used as to provide about 0.1–1.0% retained in the panel.

Other frothing aids and binders that exhibit weak foaming characteristics may be used in the present process.

Generally the mat will be formed upon one or more cover sheets which become integral parts of the final panel. Such sheets may be of paper, woven or nonwoven glass fiber, and the like. A particularly preferred cover sheet is a nonwoven glass fiber scrim, such as battery type scrim, having a weight of about 0.4–2.5 pounds per hundred square feet.

The following specific examples will further illustrate various specific embodiments of the present invention. Unless specified to the contrary, all amounts are expressed as parts by weight on a total dry solids weight basis. Of course, it is to be understood that these examples are by way of illustration only and are not to be construed as limitations on the present invention.

EXAMPLE 1

In a first evaluation, mineral wool having about 30% by weight loose and adhered shot content was mixed with a solution of 0.01% medium viscosity polyvinyl alcohol (VINOL 523). This level did not produce a stable foam but was sufficient to create a frothing type foaming of delicate, non-resilient, non-viscous and non-uniformly sized bubbles. By circulating the slurry through a centrifugal pump with air injection at the exhaust, the mineral wool was selectively entangled in the bubbles. When agitation was stopped, the fiber floated to the surface exhibiting an about 800% increase in volume of entangled fiber compared to the mass of wool before mixing. No visible shot was observed in the frothed fiber, which was dried to achieve an approximately 500% increase in fiber volume.

EXAMPLE 2

A series of evaluations were conducted with a standard mineral wool furnish for conventional dilute water interfelting and various amounts of polyvinyl alcohol (VINOL 540S). Drainage time increased geometrically with increasing amounts of polyvinyl alcohol. Substituting polyvinyl acetate for the polyvinyl alcohol as the binder over ranges of 1–6% binder and 3–10% total solids, passing the furnish through 30 seconds of high shear mixing to develop bubbles and allowing the froth to age, mature and partially dewater by gravity before drainage resulted in much lower linear rather than geometric drainage time increases.

EXAMPLE 3

Figure 2:
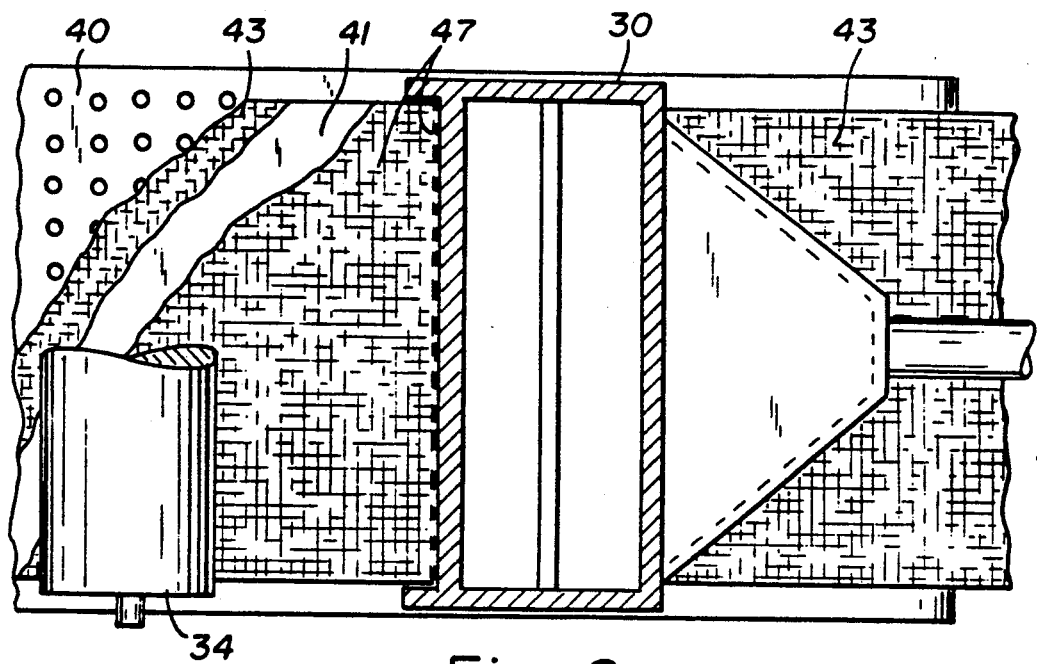
FIG. 2 is a top view cross section of a portion of the process line particularly showing the frothing head forming box apparatus of FIG. 1.
Figure 3:
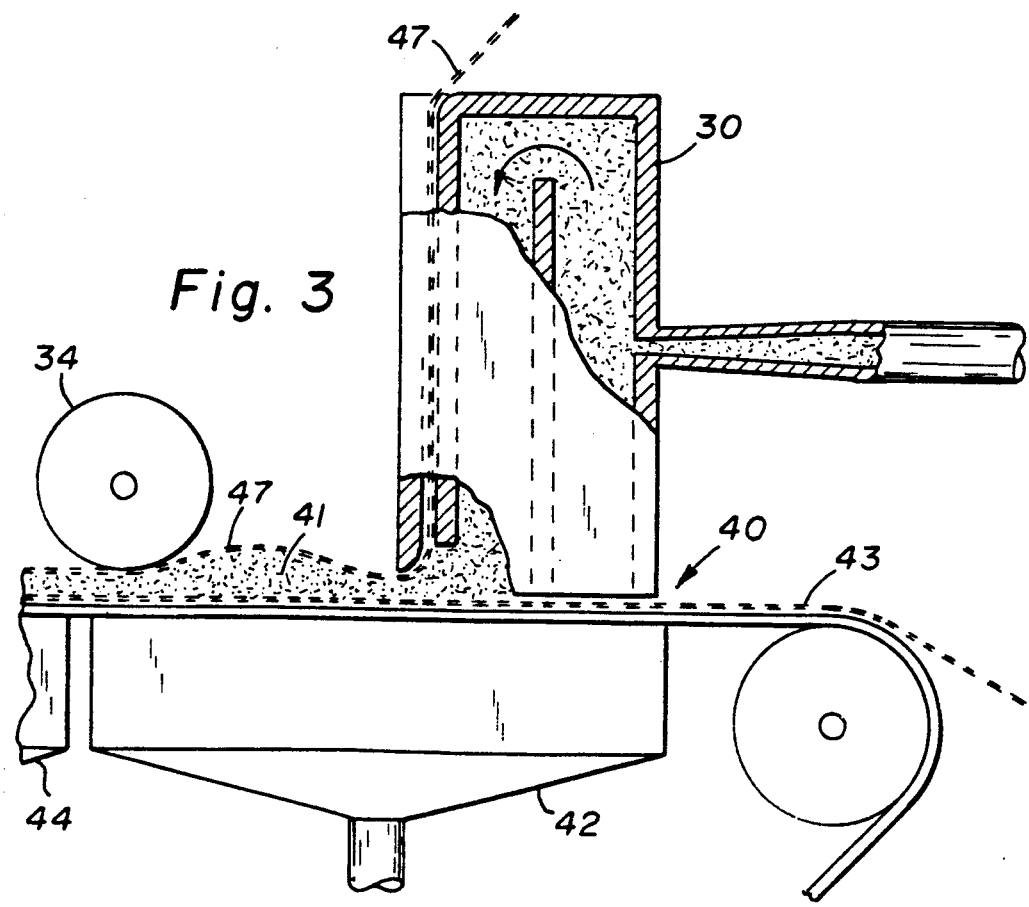
FIG. 3 is a side view cross section of the same portion of the process line with the forming box apparatus broken away to show the internal walls.

Old newspaper stock was fed to water in mix tank 11 and "slushed" by high speed impeller mixing to form an about 5% dispersion of coarse paper fiber that was then fed to main mix tank 10. A solution of 95% hydrolyzed polyvinyl acetate (VINOL 540S) was diluted in mix tank 16 and also fed to main tank 10. In addition, mineral wool, expanded perlite, starch and polyvinyl acetate were added to main mix tank 10 and diluted with water to form an about 3–6% solids dispersion proportioned to 33% expanded perlite, 33% mineral wool, 15–19% coarse paper fiber, 0–11% cooked corn starch, 0–14% polyvinyl acetate and 3% polyvinyl alcohol. After 30 seconds high shear, high speed mixing with impeller 12, which pulled a vortex of air into the area of the impeller, the dispersion was passed by pump 22 to modified head box 30 above a conventional moving foraminous wire screen of a mat forming machine, hereinafter wire 40. The modified head box 30 functioned to allow the developing froth of bubbles to consolidate the solids in the frothing mass and to further entangle the developing froth with the solids of the dispersion. The convoluting channelization through box 30, shown more particularly in FIGS. 2 and 3, enhanced the maturing and aging of the bubbles as they self-dewatered and consolidated solids, with excess water from the dewatering bubbles draining out in the controlled drainage section 42. About half-way through the head box 30 the foaming mass 41 is about 25% air by volume and the liquid is about 5% solids.

A continuous scrim bottom cover sheet 43, such as nonwoven battery scrim having a weight of about 0.8–2 pounds per 100 square feet of scrim, was applied above wire 40 before the frothing mass 41 cascaded out of box 30 onto wire 40. A similar top cover sheet 47 was fed through box 30. Feeding the top cover sheet 47 through box 30 and under smoothing roll 34 provided an intimate contact with the frothing mass 41 and assisted in smoothing out the surfaces of the panel core frothing mass 41.

The frothing mass 41 was deposited above the wire at flooded section 42, wherein the foam begins to age and degrade. At the end of this section, the foam or froth is about 50% air by volume and about 10% solids before being hit with the shock of the first vacuum section 44. At this point the froth disappears. It has been found that brief pulses (0.5–2.0 seconds) of vacuum (about 5–20 inches of mercury or about 70–280 inches of water) more rapidly and thoroughly collapse the bubbles without any substantial collapse of the open porous structured wet mass than would a lower vacuum for longer intervals. After rapid pulse high vacuum shock the mass 41 is about 25% solids with the remainder being water in an open porous structure. Underflow water was continuously withdrawn from flooded section 42 and high vacuum section 44 and pumped to a white water holding tank (not shown) for periodic recycling to main mix tank 10.

inch. Analysis of the panel and of the drainage white water from the flooded section and the various vacuum sections showed about 40–80% of the polyvinyl alcohol and polyvinyl acetate passing into the white water, depending primarily upon the solubilities of the particular alcohols used, the amount of coarse paper fiber, and the temperature of processing. Adding the white water back to main mix tank 10 maintained a low level of binder and frothing aid additions in continuous operation of the process. Exemplary panel formulations, all of which had about 5 pounds per cubic foot density, modulus of rupture of about 60 psi, noise reduction coefficients of greater than 0.75 and panel thicknesses of 0.24–2.0 inches, were:

| | COMPONENT (PERCENT) | | | | | | | PROPERTY | | |
|---|---|---|---|---|---|---|---|---|---|---|
| PAN-EL | MIN-ERAL WOOL | PER-LITE | COARSE PAPER FIBER | CORN STARCH | POLY-VINYL ACETATE | POLY-VINYL ALCOHOL | B-10 BATTERY SCRIM | WEIGHT (LB/FT$^2$) | THICK-NESS, INCHES | MODULUS OF RUP-TURE (PSI) |
| 1 | 30 | 30 | 15 | 10 | — | 1 | 14 | 0.1 | 0.24 | 60 |
| 2 | 34 | 34 | 18 | 11 | — | 1 | 2 | 1.0 | 2.0 | 120 |
| 3 | 32 | 32 | 16 | — | 5 | 1 | 14 | 0.1 | 0.24 | 60 |
| 4 | 36 | 36 | 19 | — | 6 | 1 | 2 | 1.0 | 2.0 | 120 |

After high vacuum dewatering of the wet panel, comprising bottom sheet 43, top sheet 47 and a core 41 of open, porous entanglement of fiber, aggregate and binder, it was still about 75% by weight moisture. Because of the open porous nature, that water was readily stripped off and the panel dried by rapidly passing large volumes of heated dry air through the panel first in the hooded low vacuum zone 46 and secondly in the drier 48. Conventional convection drying would require at least three hours to remove this moisture. A lessened pressure differential equivalent to about 5–70, and preferably about 5–15 inches of water (about 0.4–1.1 inches of mercury) was maintained across the surface of mass 41 in vacuum sections 46 and 48. In section 48 the vacuum pressure differential was augmented with the very slight positive pressure (about 1 inch or less of water) of dry air flow through enclosure 49 from blower 50 to aid continued stripping of water and to dry the wet mass 41. The blower was operated to provide air through mass 41 at a volume-velocity of about 50–350, and preferably about 300 cubic feet per minute of air per one square foot of mat surface with the air provided at a temperature of about 37°–180° C., preferably about 175° C. The time for a segment of core mass 41 to be stripped of water and dried from 25% solids varied considerably, depending primarily upon the core thickness which varied from about ⅛th inch through 2 inch thicknesses. Generally an about ½ inch thick panel was stripped and dried to less than 1% moisture in about 2 minutes, with about ⅔th of that moisture being removed in the first 30 seconds due to the enchanced stripping and drying resulting from the high volume, high velocity heated air flow through the open porous structure. Additional optional drying may be provided as by drier 52, which also further may be located over section 46. The resultant panels showed an open, porous core exhibiting a large number of voids of highly variable and nonuniform, irregular shapes, ranging from about 1/64th inch to about 5/16th inch in size in a typical nominal half-inch panel. Representative panels had a density from 3 to 6 pounds per cubic foot and exhibited modulus of rupture values of 60 to 120 pounds per square

What is claimed is:

1. A method for manufacturing a low density, porous structural panel of mineral fiber on a moving foraminous support wire which comprises:
   (1) forming a dilute aqueous mineral fiber slurry consisting essentially of mineral fibers, inorganic lightweight aggregate, binder and foaming aid;
   (2) mixing the slurry with air to form a frothlike, unstable mass of non-resilient, irregularly sized bubbles;
   (3) depositing the frothlike mass upon a continuous scrim bottom cover sheet;
   (4) maintaining the frothlike mass and scrim sheet under quiescent conditions in a flooded section of the foraminous wire wherein the mass rapidly dewaters by gravitational pull;
   (5) passing the frothlike mass into a high vacuum, pressure differential zone to collapse the bubbles and strip the water from the mineral fiber mass;
   (6) passing the mineral fiber mass into a lower pressure zone while passing high velocity, heated air through the mass whereby additional water is stripped from the mass; and
   (7) recovering a dried, mineral fiber, structural panel having a density of about 3 to about 10 pounds per cubic foot.

2. The method of claim 1 in which the high vacuum pressure differential in step (5) is about 4–20 inches of mercury applied across the frothlike mass.

3. The method of claim 2 in which the high vacuum is applied for brief pulses of about 0.5 to about 2 seconds duration.

4. The method of claim 1 in which in step (6) a low vacuum of from about 0.4 to about 4 inches of mercury is applied across the mineral fiber mass.

5. The method of claim 1 in which the heated air passed through the mineral fiber mass in step (6) is heated to a temperature of about 37°–180° C. and is passed through the mass at a rate of about 50–350 cubic feet per minute per square foot of mass surface.

6. The method of claim 1 in which the dried mineral fiber structural panel product in step (7) comprises from about 20 to about 70% by weight of lightweight aggregate, approximately an equal amount by weight of mineral fiber, and the balance comprises binder and foaming aid.

7. A method for manufacturing a low density, porous structural panel of mineral fiber on a moving foraminous support wire which comprises:
   (1) forming a dilute aqueous mineral fiber slurry consisting essentially of mineral fibers, inorganic lightweight aggregate, cellulose fibers, binder and foaming aid;
   (2) mixing the slurry with air to form a frothlike, unstable mass of non-resilient, irregularly sized bubbles;
   (3) depositing the frothlike mass upon a continuous scrim bottom cover sheet;
   (4) maintaining the frothlike mass and scrim sheet under quiescent conditions in a flooded section of the foraminous wire wherein the mass rapidly dewaters by gravitational pull;
   (5) passing the frothlike mass into a high vacuum, pressure differential zone to collapse the bubbles and strip the water from the mineral fiber mass;
   (6) passing the mineral fiber mass into a lower pressure zone while passing high velocity, heated air through the mass whereby additional water is stripped from the mass; and
   (7) recovering a dried, mineral fiber, structural panel having a density of about 3 to about 10 pounds per cubic foot.

8. The method of claim 7 in which the high vacuum pressure differential in step (5) is about 4–20 inches of mercury applied across the frothlike mass.

9. The method of claim 8 in which the high vacuum is applied for brief pulses of about 0.5 to about 2 seconds duration.

10. The method of claim 7 in which in step (6) a low vacuum of from about 0.4 to about 4 inches of mercury is applied across the mineral fiber mass.

11. The method of claim 7 in which the heated air passed through the mineral fiber mass in step (6) is heated to a temperature of about 37°–180° C. and is passed through the mass at a rate of about 50–350 cubic feet per minute per square foot of mass surface.

12. The method of claim 7 in which the dried, mineral fiber, structural panel product in step (7) comprises about 30–40% by weight of mineral fiber, about 30–40% by weight of lightweight aggregate, about 3–25% by weight of cellulose fibers, about 5–30% by weight of binder and about 0.1–1% by weight of foaming aid.

13. A method for manufacturing a low density, porous structural panel of mineral fiber on a moving foraminous support wire which comprises:
   (1) forming a dilute aqueous mineral fiber slurry consisting essentially of mineral fibers, inorganic lightweight aggregate, cellulose fibers, a binder selected from starch and a resin latex containing acrylic, acetate or styrene-butadiene groups, and a foaming aid;
   (2) mixing the slurry with air to form a frothlike, unstable mass of non-resilient, irregularly sized bubbles;
   (3) depositing the frothlike mass upon a continuous scrim bottom cover sheet;
   (4) maintaining the frothlike mass and scrim sheet under quiescent conditions in a flooded section of the foraminous wire wherein the mass rapidly dewaters by gravitational pull;
   (5) passing the frothlike mass into a high vacuum, pressure differential zone to collapse the bubbles and strip the water from the mineral fiber mass;
   (6) passing the mineral fiber mass into a lower pressure zone while passing high velocity, heated air through the mass whereby additional water is stripped from the mass; and
   (7) recovering a dried, mineral fiber, structural panel having a density of about 3 to about 10 pounds per cubic foot.

14. The method of claim 13 in which the binder is polyvinyl acetate and the foaming aid is polyvinyl alcohol.

15. The method of claim 14 in which the high vacuum pressure differential in step (5) is about 4–20 inches of mercury applied across the frothlike mass.

16. The method of claim 15 in which the high vacuum is applied for brief pulses of about 0.5 to about 2 seconds duration.

17. The method of claim 14 in which in step (6) a low vacuum of from about 0.4 to about 4 inches of mercury is applied across the mineral fiber mass.

18. The method of claim 14 in which the heated air passed through the mineral fiber mass in step (6) is heated to a temperature of about 37°–180° C. and is passed through the mass at a rate of about 50–350 cubic feet per minute per square foot of mass surface.

19. The method of claim 14 in which the dried mineral fiber structural panel product in step (7) comprises about 30–40% by weight of mineral fiber, about 30–40% by weight of lightweight aggregate, about 3–25% by weight of cellulose fibers, about 5–30% by weight of polyvinyl acetate and about 0.1–1% by weight of polyvinyl alcohol.

* * * * *